Aug. 25, 1959     T. R. ISBISTER     2,900,683
WEATHER STRIP DEVICE
Filed May 16, 1956
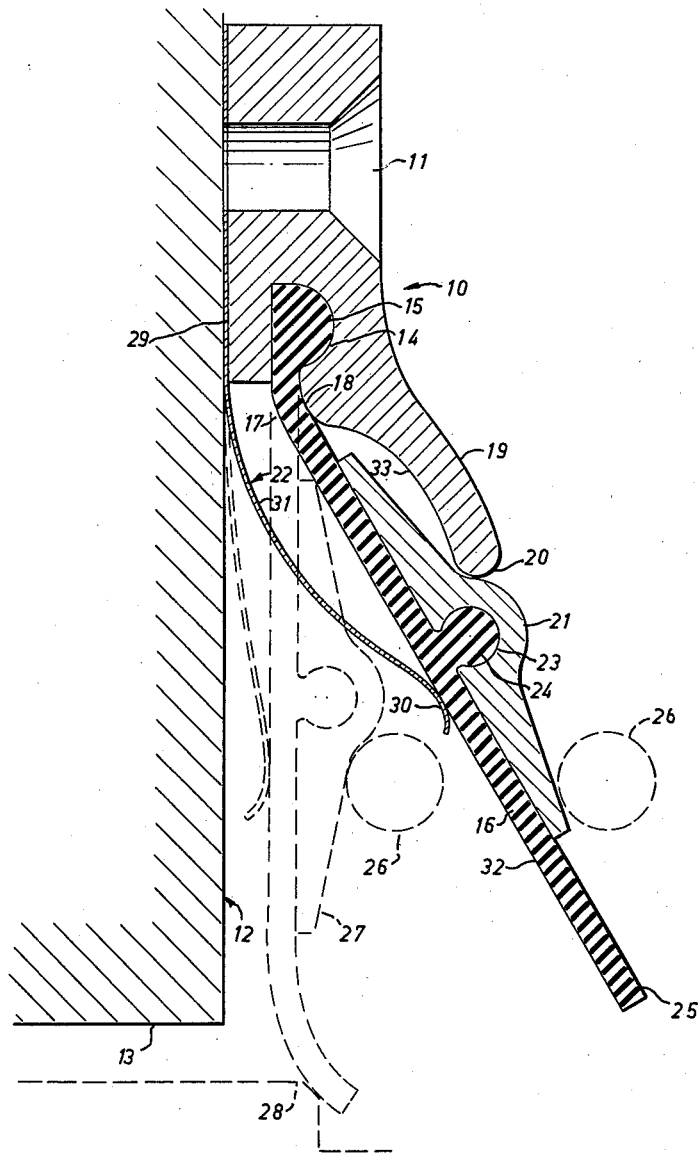
Inventor
THOMAS R. ISBISTER

United States Patent Office 2,900,683
Patented Aug. 25, 1959

2,900,683

WEATHER STRIP DEVICE

Thomas Robertson Isbister, Toronto, Ontario, Canada

Application May 16, 1956, Serial No. 585,319

1 Claim. (Cl. 20—67)

This invention relates to a weather strip device adapted for use in sealing the threshold of a door.

Prior door threshold weather strip devices of one known class comprise a flexible member or strip adapted to be fastened along one edge of the door adjacent the threshold edge thereof to dispose the depending free edge in position for engagement with the threshold when the door is closed. Such prior devices utilize the sealing strip as its own hinge member. Usually, it has been necessary to reinforce the sealing strip throughout its length near the free sealing edge thereof by fastening a strip of wood thereto. While such prior devices are satisfactory in use for a short period of time, the weathering of that portion of the sealing strip acting as a hinge reduces the effectiveness of the latter. Moreover, sleet and icing conditions quickly render prior devices of the class effectively inoperative. Such devices as have been provided, have been formed of woden or like strips required to be fastened to the sealing member by screws or other direct fastening means, thereby complicating the assembly of the components and giving rise to problems of alignment of the sealing strip during installation.

It is the main object of the present invention to provide a weather strip device of the elastomer hinge class embodying a weather protecting mantel adapted to protect the hinge region thereof against weathering.

It is a further object of the invention to provide a weather strip device of the elastomer hinge class in which the supporting components for the elastomer sealing strip are formed by extrusion and embody a locking recess adapted for ready assembly with the sealing strip; the said sealing strip likewise being of extruded form and embodying co-operating locking means thereon for longitudinal assembly with the supporting components.

With the foregoing and other objects in view, the invention will be appreciated in more detail by a study of the following specification taken in conjunction with the accompanying drawing.

In the drawing:

A preferred structure of weather strip device of the invention is shown in enlarged section in association with elements indicating its manner of use.

The weather strip device of the invention comprises a mantel bracket 10 preferably extruded to the section shown from a suitable extrudable metal such as aluminum and having the counter-sunk holes 11 spaced therealong whereby the same may be fastened by suitable screws (not shown) to a door face 12 adjacent the threshold edge 13 thereof. The mantel bracket carries a longitudinal inwardly enlarged slot or socket 14 adapted to receive the anchoring head or enlargement 15 in the form of an upper edge enlargement on the flexible elastomer sealing strip body 16. The sealing body 16 depends downwardly and is adapted for hinge action in the region 17 thereof over the downwardly and forwardly extending arcuate surface 18 of the mantel lip 19 of bracket 10, the mantel lip extending arcuately forwardly and downwardly for engagement of its depending terminal edge 20 with the stiffener fitting 21 of the body 16 when the latter is freely disposed in the outward position shown in bold lines under action of the biasing leaf spring 22 clamped between the mantel bracket 10 and the door surface 12.

The stiffener fitting is generally in the form of a strip having a longitudinal inwardly enlarged recess 23 adapted to provide a socket for locking reception of the locking bead or enlargement 24 extending from the elastomer body 16 longitudinally thereof and integral therewith, being formed in the extrusion of the said body. The body 16 projects below the stiffener fitting 21 to provide a free flexible sealing flange portion 25.

The leaf spring 22 need not extend the full length of the mantel bracket and is preferably placed at that end of the mantel bracket which extends to the free side edge of the door as opposed to the hinged edge of the door. The door jamb (not shown) adjacent the free edge of the door preferably carries an actuating member in the form of a stud 26 adapted to be engaged by the outward end of the stiffener fitting 21 as the door is swung to the closed position to thereby urge the elastomer body on its hinged region 17 and against the pressure of spring 22 to swing to the position shown in chain lines 27 at which the free edge or sealing flange 25 thereof engages the threshold 28.

The spring 22 is substantially enclosed between the elastomer body 16 and the door surface 12 by reason of the forward displacement of the body as determined by the location of the socket 14 relative to the mounting surface 29 of the mantel bracket 10. The leaf spring embodies a flange portion 30 of reverse curvature relative to the curvature of the main body portion 31 thereof whereby a limited but smooth sliding action against the inner surface 32 of the elastomer body 16 is achieved. The spring is adapted by virtue of its construction to accomplish a small amount of sliding movement and by reason of its concealment behind the elastomer body 16, is substantially protected against weathering.

The hingeable region 17 of the elastomer body 16 is likewise protected against weathering by the depending mantel member 19. In this respect, it will be observed that the inner forwardly curved surface 33 of the depending mantel member is adapted at all times for clearance with the stiffener fitting except at the terminal edge 20 thereof. It should also be observed that the stiffener fitting in its upper portion projects upwardly to substantially cover the upper surfaces of the elastomer body 16 substantially to the hingeable region 17 thereof. By this means, the hingeable region is effectively protected against the effects of sleeting and icing conditions and is also protected against general weathering and sunlight.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claim.

What I claim as my invention is:

In combination: a self suspendable elastomer sealing member defined by an extruded elongated body having side edges one of which serves as a sealing edge; a longitudinal bead-like enlargement defining the other edge of said member; an extruded bracket having a longitudinal recess to snugly receive said elastomer sealing member enlargement for suspension of said elastomer sealing member therefrom; said enlargement in said recess serving as the sole, self suspendable hinge means of said elastomer sealing member; a longitudinal bead-like formation parallel to said elastomer sealing member edges and forming a part of said member, an extruded stiffener fitting having a longitudinal recess for slidable assembly on said bead-like formation; a downwardly and forwardly extending portion of said bracket partially overlapping said stiffener fitting for engagement therewith upon forward motion of said sealing member about said hinge means; and spring means urging said elastomer sealing member swingably outwardly with respect to said downwardly and forwardly extending portion of said bracket, said spring means by its urging, causing the forward motion of the sealing member.

References Cited in the file of this patent

UNITED STATES PATENTS

| | | |
|---|---|---|
| 282,160 | Cady | July 31, 1883 |
| 316,264 | Heaford | Apr. 21, 1885 |
| 575,224 | Fournier | Jan. 12, 1897 |
| 937,193 | Steger | Oct. 19, 1909 |

FOREIGN PATENTS

| | | |
|---|---|---|
| 8,338 | Great Britain | June 7, 1888 |
| 64,586 | Norway | Mar. 23, 1942 |